E. H. BICKFORD.
MOTOR CAR HEATING DEVICE.
APPLICATION FILED DEC. 18, 1912.

1,114,438.

Patented Oct. 20, 1914.

Witnesses.
H. L. Trimble.
A. G. Kelly.

Inventor.
E. H. Bickford,
by H. J. S. Dennison
Atty.

UNITED STATES PATENT OFFICE.

EDWARD H. BICKFORD, OF TORONTO, ONTARIO, CANADA.

MOTOR-CAR-HEATING DEVICE.

1,114,438. Specification of Letters Patent. Patented Oct. 20, 1914.

Application filed December 18, 1912. Serial No. 737,457.

*To all whom it may concern:*

Be it known that I, EDWARD HASTINGS BICKFORD, a subject of the King of Great Britain, and resident of the city of Toronto, county of York, Province of Ontario, in the Dominion of Canada, have invented certain new and useful Improvements in Motor-Car-Heating Devices, described in the following specification and illustrated in the accompanying drawings.

The principal features of the present invention consist in the novel construction and arrangement of parts, whereby a supply of warm air is directed to the interior of the car.

The objects of the invention are to render motoring in cold weather more comfortable by providing a supply of warm air to the interior of the car, utilizing the heat generated by the engine to the best advantage and to devise a simple and inexpensive equipment which may be readily placed in any car without interfering with or altering the mechanical equipment of the car.

Figure 1:
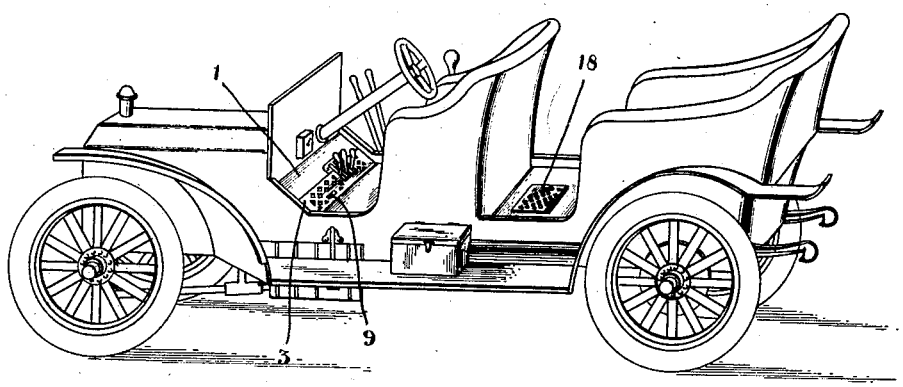
Figure 2:
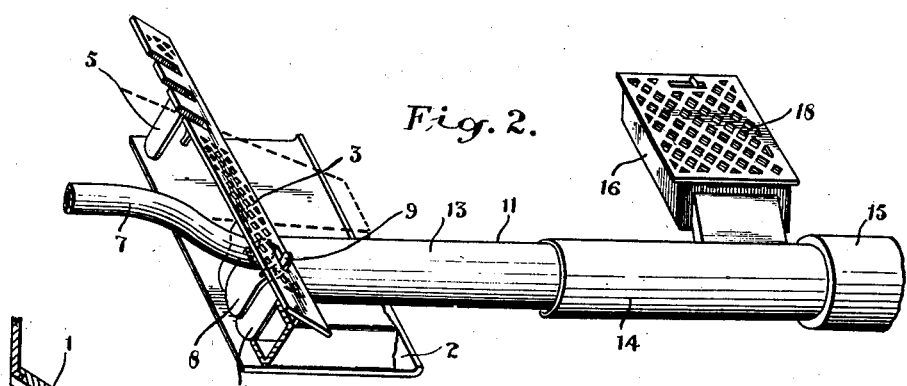
Figure 3:
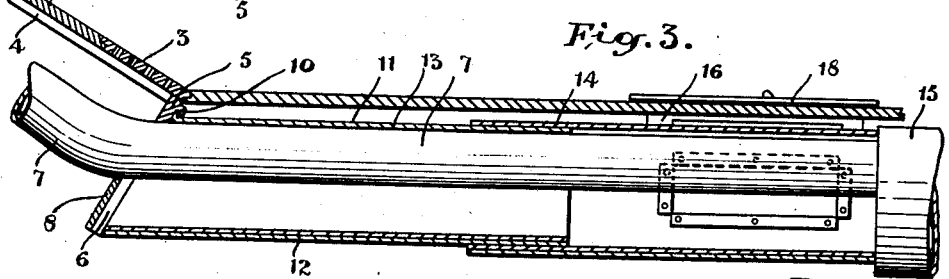
Figure 4:
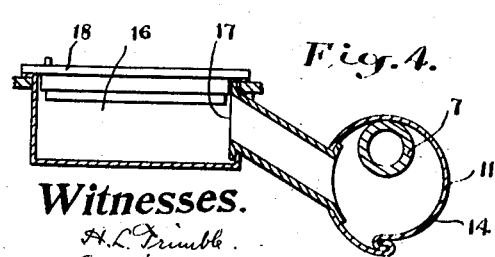
Figure 5:
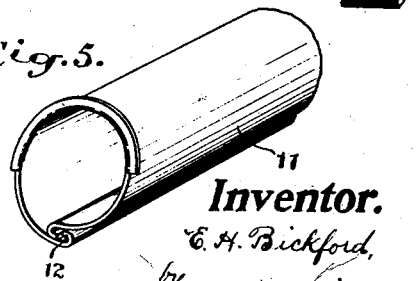

In the drawings, Figure 1 is a perspective view of a motor car showing my device installed therein. Fig. 2 is a detail perspective view of my equipment assembled, showing the exhaust pipe from the engine and a portion of the engine bed and car frame, a portion of the engine being shown in dotted lines. Fig. 3 is a sectional elevational view of the equipment. Fig. 4 is a cross sectional view through the register for the rear of the car and the hot air pipe. Fig. 5 is a perspective detail of the front length of the hot air conduit showing the longitudinal edges separated ready for placing around the engine exhaust pipe.

Like numerals of reference indicate corresponding parts in each figure.

Referring to the drawings, 1 is the sloping foot board in the front compartment of the car. 2 is the engine bed or an extension therefrom extending rearwardly beneath said foot board and across the car.

3 is a plate in the form of a register or grille, forming a portion of the sloping foot board, and preferably extending across the car and resting at the ends upon the side sills 4.

5 is a baffle plate, preferably formed integral with the plate 3, extending downwardly from said plate and fitting close to the engine bed 2 or its extension and closing the space between the car body and said bed. The baffle plate 5 is formed with its lower edge shaped to any suitable contour to fit around any portions of the engine bed or parts carried thereon. The engine chamber inclosed by the hood, engine bed and forward portion of the car body is thus closed at the rear side and the baffle plate 5 which preferably slopes forwardly and downwardly from the register 3, directs the air entering the engine chamber upwardly through the grille, where the driver places his feet. The air is heated by contact with the engine and particularly the exhaust pipe which when the engine is running becomes very hot and a constant supply of warm air is directed into the forward portion of the car beneath the robe or cover worn by the driver or occupants of the front seat.

6 is a slot in the baffle plate 5 through which the exhaust pipe 7 of the engine extends. The exhaust pipe in most cars is raised above the engine bed consequently the slot 6 leaves an opening below the baffle, or if the construction of the car permits, the opening may be above the pipe.

8 is a plate pivotally connected to the baffle at one side of the slot 6 and adapted to close the said slot, said plate having a suitable lever extension 9 projecting upwardly through a slot in the grille by means of which the plate may be swung to open or close the slot to allow or arrest the flow of air therethrough.

10 are hook shaped lugs formed on the rear side of the baffle 5 adjacent to the slot 6.

11 is a sleeve of sheet metal adapted to encircle the exhaust pipe at the rear of the baffle plate and formed with reverse hook shaped edges 12 adapted to lock together. The sleeve is so constructed that it may be sprung open and placed around the exhaust pipe and the hooked edges are then brought together and locked. The sleeve 11 is preferably formed in two sections the front section 13 being formed to fit snugly against the rear of the baffle 5 and preferably having an outwardly turned flanged edge to engage the hook shaped lugs 10. The rear sleeve section 14 fits over the rear end of the front section 13 and at the rear end abuts the muffler 15.

16 is a sheet metal box open at the top and arranged in an opening in the floor of the rear compartment of the car and having a duct 17 leading from one side and communicating with the rear sleeve section 14.

18 is a register or grille of any suitable design covering the top of the box 16.

In the use of this device, the air entering the engine chamber is driven rearwardly by the usual fan and becomes heated as described and passes to the front compartment of the car. When the slot 6 is open a portion of the moving air flows through the slot around the engine exhaust pipe and is conducted the full length of said exhaust pipe within the sleeve 11 and becoming thoroughly heated it flows through the air duct 17, box 16 and register 18, thus heating the rear compartment.

The equipment herein described is very simple and inexpensive and may be placed in any car in a few minutes. A portion of the ordinary foot board is lifted out and the grille 3 is dropped into place the sleeve sections being then slipped over the exhaust pipe and the box 16 is fitted into an opening cut in the floor of the rear section of the car. One end of the air duct 17 is preferably secured to the sleeve and the other end is then inserted into the opening in the side of the box and the flanges spread out. The register is then dropped into place and the equipment is complete.

The sleeve encircling the exhaust pipe is formed in two lengths in order to facilitate the placing of same and also to allow of any slight adjustment in length which may be necessary in order that the front end may fit snugly against the baffle plate and the rear end abut the muffler. The sleeve when fitted snugly into place will not rattle or be objectionable in any way and may be taken off or replaced in a few minutes.

I am aware that various means have been devised for supplying heated air to the interior of motor cars, the air being heated by contact with the engine or exhaust pipe and I do not make any claim broadly to the principle involved but I do claim certain features of construction which enable the heating of a motor car in a very simple and inexpensive manner.

What I claim as my invention is:—

1. In a motor car heating device, the combination with the engine, exhaust pipe, and car body, of a grille arranged in the sloping foot board of the car body and having a downwardly projecting baffle member which extends around the engine exhaust pipe and close to the engine bed throttling the flow of air around the engine and exhaust pipe and directing the heated air upwardly through the grille.

2. In a motor car heating device, the combination with the engine, exhaust pipe, and car body, of a grille arranged in the foot board of the car body, a baffle extending downwardly from said grille and directing a current of air upwardly therethrough, said baffle having an opening through which the exhaust pipe of the engine extends, a sleeve encircling said exhaust pipe and extending rearwardly from said baffle and forming an air duct communicating with the opening through said baffle, a suitable register placed in the rear compartment of the car, and an air duct leading from said sleeve and directing a supply of warm air to said register.

3. In a motor car heating device, the combination with the engine, exhaust pipe, and car body, of a grille arranged in the foot board of the car body, a baffle closing the space between the car body and the engine bed and directing a current of air upwardly through said grille, said baffle having an opening therethrough through which the exhaust pipe of the engine extends, a sleeve encircling said exhaust pipe and extending rearwardly from said baffle and forming an air duct communicating with the opening through said baffle, a suitable register placed in the rear compartment of the car, an air duct leading from said sleeve and directing a supply of warm air to said register, and a damper plate adapted to be moved across the opening in said baffle plate to check the flow of air through said sleeve.

4. In a motor car heating device, the combination with the engine, exhaust pipe, and car body, of a grille arranged in the foot board of the car body, a baffle closing the space between the car body and engine bed and directing a current of air upwardly through said grille, said baffle having an opening therethrough through which the exhaust pipe of the engine extends, a sleeve formed of a length of sheet metal having the longitudinal edges formed reverse hook shape adapted to lock together, said sleeve being placed around the exhaust pipe and abutting the rear of said baffle and having an opening in the side adjacent to the rear end, an air duct leading from the opening in the side of said sleeve, and a register arranged in the floor of the car and communicating with said air duct.

5. In a motor car heating device, the combination with the engine, exhaust pipe, car body and muffler, of a grille arranged in the foot board of the car body, a baffle closing the space between the car body and engine bed and directing a current of air upwardly through said grille, said baffle having an opening therethrough through which the exhaust pipe of the engine extends, a sleeve encircling the exhaust pipe and formed in two lengths the forward length having a beveled front end adapted to fit snugly against the back of the said baffle and the rear length telescoping over the front length and abutting the engine exhaust muffler, each of said lengths being formed with an open lock seam adapted to be sprung apart and slipped over the exhaust pipe and the seamed edges hooked together, a laterally extending air duct secured to the rear length of said sleeve, and a register arranged in the floor of the car and communicating with said air duct.

Signed at the city of Toronto, county of York, Ontario, Canada, this 14th day of December 1912.

EDWARD H. BICKFORD.

Witnesses:
T. A. WELCH,
E. HERON.